United States Patent [19]
Scott

[11] 3,869,258
[45] Mar. 4, 1975

[54] FLUID UNIT ROTOR AND METHOD OF MANUFACTURE

[75] Inventor: William B. Scott, Plymouth, Mich.

[73] Assignee: General Motors Corporation, Detroit, Mich.

[22] Filed: Sept. 5, 1972

[21] Appl. No.: 286,159

[52] U.S. Cl....... 29/156.8 FC, 416/180, 29/156.8 R
[51] Int. Cl............................................. B23p 15/04
[58] Field of Search............ 29/156.8 FC, 156.8 CF, 29/156.8 R; 416/180, 213, 214 A

[56] References Cited
UNITED STATES PATENTS

| | | | |
|---|---|---|---|
| 2,115,895 | 5/1938 | Weihmann | 416/180 |
| 2,692,562 | 10/1954 | Zeidler | 29/156.8 FC |
| 3,147,541 | 9/1964 | Hathaway | 29/156.8 CF |
| 3,179,329 | 4/1965 | Dybvig | 416/213 |
| 3,512,612 | 5/1970 | Bragg et al. | 188/1 B |
| 3,562,888 | 2/1971 | Settle | 29/159 |
| 3,708,846 | 1/1973 | Worner | 29/156.8 |

Primary Examiner—C. W. Lanham
Assistant Examiner—Dan C. Crane
Attorney, Agent, or Firm—Charles R. White

[57] ABSTRACT

Hydrodynamic unit rotor in which a central flange portion of an outer sheet metal shell is interleaved with metal connector plates. The connector plates and flange portion are secured to each other and to a small steel hub by annular electron beam welds.

3 Claims, 3 Drawing Figures

PATENTED MAR 4 1975　　　　　　　　　　　　　　　　　3,869,258

FLUID UNIT ROTOR AND METHOD OF MANUFACTURE

This invention relates to hydrodynamic torque transmitting units and more particularly to new and improved hydrodynamic unit rotors and to a new and improved method of manufacturing such rotors.

The rotor of a hydrodynamic unit, such as the turbine of a torque converter or coupling, generally comprises an outer annular shell member of sheet metal that has an inwardly extending flange which is riveted to a large annular flange of an internally splined hub. These hubs, usually made from castings of Armasteel or other suitable metal, are machined to provide support shoulders and contact surfaces held at close tolerances to insure the proper fit of the flange of the shell member on the hub. Additionally, a series of holes arranged in a circle are drilled in the flange of the hub to match corresponding holes in the flange of the outer shell to accommodate the rivets employed to join these two members. After connecting the outer shell to the hub an inner shell is joined to the outer shell using a plurality of spaced blades. These blades have inner and outer tabs which extend through slots in the two shells and which are rolled over to securely fasten the shell together. While these prior rotors are highly satisfactory for employment in torque converters and couplings the hub casting, machining and drilling as well as the riveting to the shell member added substantially to the cost of the rotor.

In the present invention the prior art cast metal hub is replaced by a small steel hub that can be readily made from bar stock on a screw machine. The large flange of the prior art hub is replaced by washer-like connector plates that can be made from the center disks produced from transmission clutch plate stampings. In the preferred embodiment of the invention the connector plates are installed on the hub with the flange of the outer rotor sandwiched between two of the plates and welded together by electron beam welding. In addition to welding the flange to the connector plates, the electron beam weld secures the flange on the connector plates to the hub.

It is a feature, object and advantage of this invention to provide a new and improved method of manufacturing a fluid unit rotor in which the inner flange of a rotor shell is interleaved with and welded to connector plates and the connector plates and flange are welded to a central hub member.

Another feature, object and advantage of this invention is to provide a new and improved fluid unit rotor that is drivingly connected to a central hub member by a central flange drivingly connected between two flange plates secured to the hub member.

These and other features, objects and advantages of this invention will become more apparent from the following detailed description and drawing in which.

Figure 1:
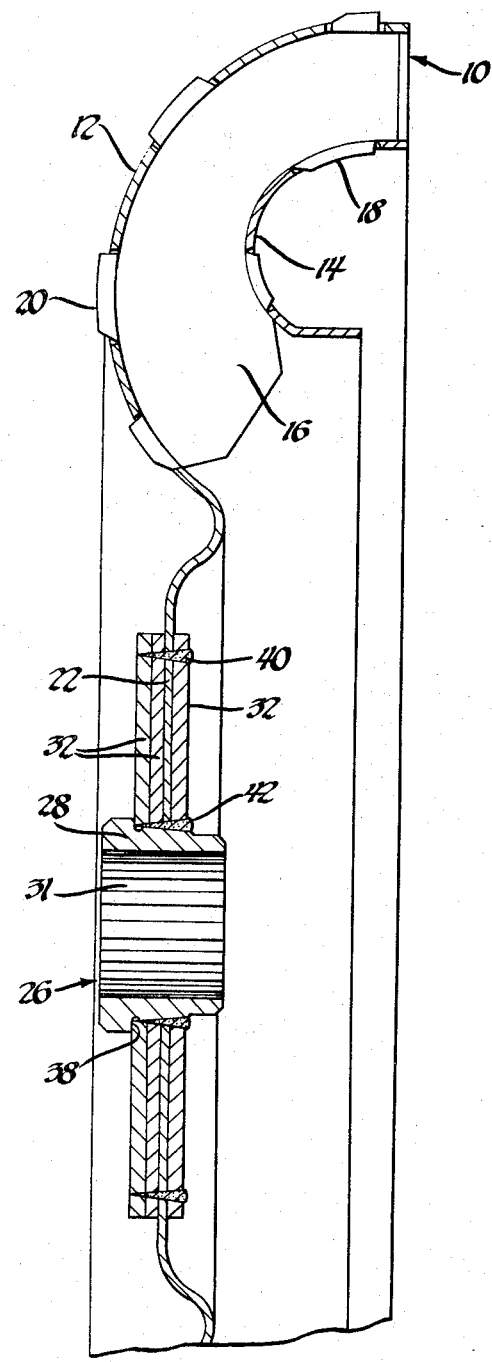
FIG. 1 is a sectional view of a hydrodynamic unit rotor with parts broken away illustrating this invention.
Figure 3:
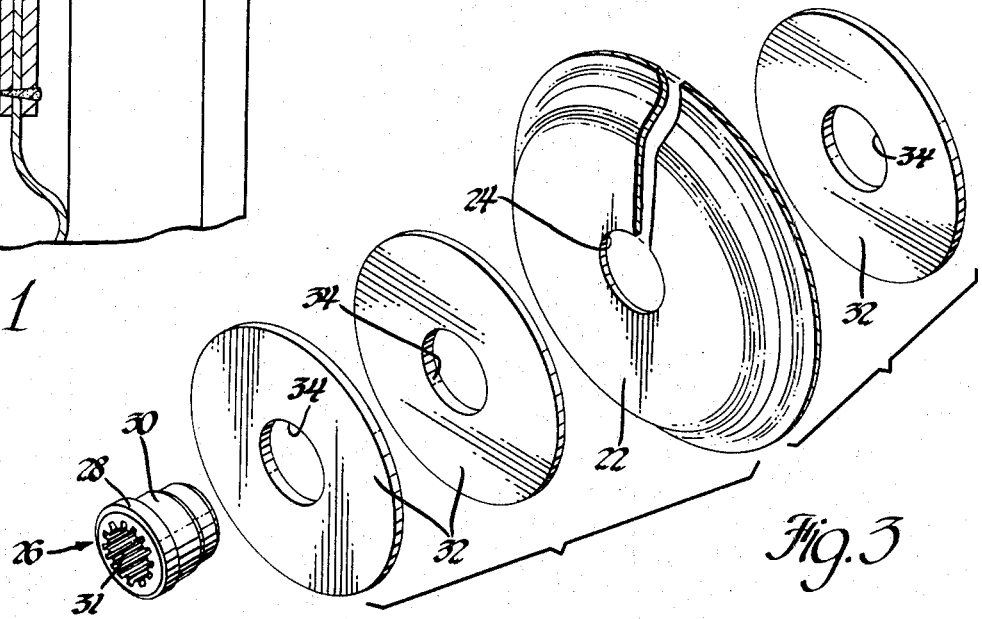
FIG. 3 is an exploded perspective view of a portion of the rotor of FIG. 1.

As shown in FIG. 1 there is a converter turbine rotor assembly 10 having an annular outer shell 12 and an annular inner shell 14. The outer and inner shells are sheet metal and are secured together by a plurality of evenly spaced blades 16. Each blade is formed with inner and outer tabs 18 and 20 which extend through slots in the shells and which are rolled over to secure the shells to each other. The outer shell is formed with a central flange 22 that has a central opening 24 best shown in FIG. 3 for receiving a turbine hub 26.

Hub 26 is a sleeve-like steel member having an enlarged head 28 and a reduced diameter cylindrical shank portion 30 that fits into the opening 24 of flange 22. The hub is internally splined at 31 for driving connection with an output shaft, not shown. The flange 22 is sandwiched between two of three washer-like connector plates 32 each having a central opening 34 of a diameter large enough to permit their installation on the shank portion 30 of hub 26. The first or forward plate 32 abuts against a locating shoulder 38 formed by the head 28 of hub 26. The flange of the outer shell and the plates 32 are secured to each other by concentric annular electron beam welds 40 and 42. Weld 40 also rigidly secures the plates 32 and the flange 22 to the shank portion 30 of hub 26.

The hub 26 is preferably made from cylindrical bar stock with the head 28 and shank portion 30 formed on a screw machine. The internal splines 31 are made by broaching. The connector plates 32 are identical steel rings that can be readily made from the annular disk offal accumulated from the stamping of transmission clutch plates such as those shown in U.S. Pat. No. 3,081,854 to K. E. Snyder, issued Mar. 19, 1963. The solid disks, previously scrapped, have a diameter and are full hard tempered to meet the size and material requirements for plates 32. These disks provide blanks that are punched with central openings 34 to fit on the shank portion 30 of hub 26.

To weld the parts together the first two plates 32 are placed on the shank portion of hub 26 with the outer disk abutting shoulder 38. The outer shell of the turbine is then placed in position, with the shank portion of the turbine hub extending through opening 24 of shell flange 22 and with the front face of flange 22 contacting the intermediate plate 32. The third plate 32 is placed on the shank portion of the hub in contact with the rear face of flange 22. The parts thus assembled are staked together by upsetting a small portion of metal of hub 28 behind the third plate radially above the opening 34 at different circumferential points to hold the plates 32 and the flange 22 of the outer shell in position.

The assembly is loaded in a fixture in an electron beam welder. The welder is then activated to join the assembly by concentric welds 40 and 42 made in separate passes. Preferably the axis of the electron beam is directed generally parallel to the axis of the hub 26 and the beam is focused at a point coplanar with the front face of the first plate 32.

Annular welds 40 and 42 can be made by turning the assembly relative to an energized stationary electron gun or the electron gun can be tracked in fixed concentric circular paths relative to the assembly held stationary.

Upon completion of the welding, the welded rotor is removed from the welder and finished by brushing off any spatter from the inner and outer plates 32 resulting from the welding operation. Then the plates are roller burnished to a smooth finish for contact with thrust members of a converter or coupling. The inner shell is then joined to the outer shell by employing the tabbed blades 16.

Figure 2:
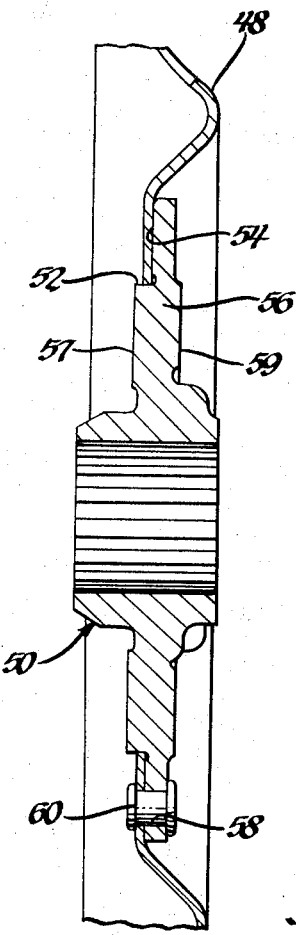
FIG. 2 is a sectional view of a portion of a hydrodynamic unit rotor illustrating the prior art.

FIG. 2 illustrates a prior art rotor comprising an annular sheet metal shell 48 drivingly secured to an internally splined hub 50. This hub is made from a casting of Armasteel or other suitable metal. To provide for the proper fit of the hub and the shell, an annular support shoulder 52 and an offset contact face 54 is machined from the thick flange 56 of the hub. The diameter of the shoulder 52 has to be held to close tolerances and made concentric with the splines of the hub. Also the face 54 has to be precisely located and square with the hub splines for accurately positioning and locating the shell on the hub. Front and rear surfaces 57 and 59 of the hub are machined to provide bearing surfaces for contact with thrust washers in the torque converter in which this rotor is employed. In addition to this machining, ten rivet holes 58, equally spaced, are drilled in the flange 56 at precise positions in relation to the diameter of the flange 56.

The flange of the shell 48 is formed with a central opening to fit on shoulder 52 and also is formed with rivet holes that correspond to the holes 58 in the flange of the hub. With the parts thus formed they are assembled and securely joined by rivets 60. Subsequently an inner shell is secured to the outer shell by the vanes as described above.

From the above it will be appreciated that this invention provides a new and improved rotor and a new and improved method of manufacturing such rotors. With this invention the hub is materially reduced in size and cost. By employing disk-like connector plates between a small hub and rotor instead of the prior art hub machined from a casting the rotor can be manufactured with little machining, with less effort and at reduced costs. Since the connector plates can readily be made from the center disks produced as a by product from clutch plate stamping material is more efficiently used.

While a preferred construction and method of manufacture have been disclosed for purposes of illustrating this invention, the scope of the invention is limited only by the following claims.

I claim:

1. A method of making a torque transmitting rotor of a hydrodynamic unit for a power transmission comprising the steps of stamping sheet metal stock to simultaneously produce backing ring means for transmission disc clutches and circular disc means formed by the stamped centers of said backing ring means, providing a tubular rotor hub with an enlarged curved head portion and a reduced diameter cylindrical shank portion, forming a central opening with axially extending internal splines in said hub, making an enlarged annular opening in the center of each of said disc means with a diameter sufficiently large to permit a slip fit of said disc means onto said cylindrical shank portion of said rotor hub, making an annular rotor shell with a central flange portion, forming an annular opening in the center of said flange portion with a diameter sufficiently large to permit a slip fit of said rotor shell onto said cylindrical shank portion, inserting said rotor hub into the opening of first of said disc means so that said shank portion extends through the central opening in said first disc means and said head portion abuts against one side of said first disc means, loading said rotor shell on said hub member so that said shank portion extends through said central opening of said flange portion and so that said flange portion of said rotor shell contacts the adjacent surface of said first disc means, loading second disc means on said hub member so that said shank portion extends through the annular opening therein and said second disc means contacts the adjacent surface of said flange portion of said rotor shell, staking said disc means and said flange portion in an interleaved position on said shank portion of said hub, electron beam welding said disc means and said flange portion to each other with a first circular electron beam weld focused at a predetermined depth and extending through all of said disc means, and utilizing the same focal depth as said first weld to electron beam weld said disc means and said flange portion to each other and to said shank portion by a second circular electron beam weld which has a diameter smaller than said first circular electron beam weld and which extends to said head portion through all of said disc means.

2. A method of making a torque transmitting rotor of a hydrodynamic unit for a power transmission comprising the steps of stamping sheet metal stock to simultaneously produce flat backing ring means for transmission disc clutches and flat circular disc means formed by the stamped centers of said backing ring means, machining metallic bar stock to provide a tubular rotor hub with an enlarged curved head portion and a reduced diameter cylindrical shank portion, providing a central opening in said hub with axially extending splines, making an enlarged annular opening in the center of each of said disc means with a diameter sufficiently large to permit a slip fit of said disc means onto said cylindrical shank portion of said rotor hub, making an annular rotor shell having an outer torroidal channeled portion and a central flange portion, forming an annular opening in the center of said flange portion with a diameter sufficiently large to permit a slip fit of said rotor shell onto said cylindrical shank portion, inserting said rotor hub into the opening of first of said disc means so that said shank portion extends through the central opening in said first disc means and said head portion abuts against an outer side face of said first disc means, loading said rotor shell on said hub member so that said shank portion extends through said central opening of said flange portion and so that said flange portion of said rotor shell contacts the adjacent inner side face of said first disc means, loading second disc means on said hub member so that said shank portion extends through the annular opening therein and an inner side face of said second disc means contacts the adjacent surface of said flange portion in an interleaved position on said shank portion of said hub, energizing and focusing electron beam welding means, electron beam welding all of said disc means and said flange portion to each other with a tapered first circular electron beam weld having a focus coplanar with an outer side face of one of said disc means, and electron beam welding all of said disc means and said flange portion to each other and to the outer circumference of said shank portion by a second tapered circular electron beam weld utilizing the same focal depth as said first weld and of a diameter smaller than said first circular electron beam weld so that said second weld extends to said head portion and terminates at a focus coplanar with the outer side face of one of said disc means.

3. A method of making a torque transmitting rotor of a hydrodynamic unit for a power transmission comprising the steps of stamping sheet metal stock to simultaneously produce a plurality of flat backing ring means for transmission disc clutches and a plurality of flat circular disc means of a predetermined diameter formed by the stamped centers of said backing ring means, machining metallic bar stock to provide a tubular rotor hub with an enlarged annular head portion and a reduced diameter cylindrical shank portion, forming a central opening having axially extending internal splines in said hub radially spaced from the central axis thereof, stamping an enlarged annular opening in the center of each of said disc means with a diameter sufficiently large to permit a slip fit of said disc means onto said cylindrical shank portion of said rotor hub, providing an annular rotor shell with a central flange portion, forming an annular opening in the center of said flange portion with a diameter sufficiently large to permit a slip fit of said rotor shell onto said cylindrical shank portion, inserting said rotor hub into the opening of first of said disc means so that said shank portion extends through the central opening in said first disc means and said head portion abuts against an outer side face of said first disc means, loading said rotor shell on said hub member so that said shank portion extends through said central opening of said flange portion and so that said flange portion of said rotor shell contacts an inner side face of said first disc means, loading second disc means on said hub member so that said shank portion extends through the annular opening therein and an inner side face of said second disc means contacts the adjacent surface of said flange portion of said rotor shell, staking said disc means and said flange portion in an interleaved position on said shank portion of said hub, positioning electron beam welding means substantially parallel to the axis of said hub, focusing the beam of electrons at a point coplanar with said outer side face of said first disc means, electron beam welding said disc means and said flange portion to each other with a tapered first circular electron beam weld extending through all of said disc means and said flange portion focused on a circular path of points coplanar with the outer side face of said first disc means, and electron beam welding said disc means to said flange portion and to the outer circumference of said shank portion by a second tapered circular electron beam weld extending through all of said disc means and flange portion and focused at a circular path of points of a diameter smaller than said head portion and coplanar with the outer side face of said first disc means to thereby provide plural weld connections which have the same focal depth and which have the strength sufficient to transfer torque from said rotor shell to said hub without fracture produced by operation of said hydrodynamic unit.

\* \* \* \* \*